(12) United States Patent
Sohn

(10) Patent No.: US 8,488,723 B2
(45) Date of Patent: *Jul. 16, 2013

(54) DEVICE AND METHOD FOR DETECTING TIMING SYNCHRONIZATION

(75) Inventor: Kyung Yeol Sohn, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 247 days.

This patent is subject to a terminal disclaimer.

(21) Appl. No.: 12/972,897

(22) Filed: Dec. 20, 2010

(65) Prior Publication Data

US 2011/0150150 A1    Jun. 23, 2011

(30) Foreign Application Priority Data

Dec. 21, 2009   (KR) .......................... 10-2009-0128406

(51) Int. Cl.
*H04L 27/06* (2006.01)

(52) U.S. Cl.
USPC ........... 375/343; 375/316; 375/354; 375/356; 375/365; 375/367; 375/368; 375/369

(58) Field of Classification Search
USPC ................. 375/343, 316, 354, 356, 365, 367, 375/368, 359
See application file for complete search history.

(56) References Cited

U.S. PATENT DOCUMENTS

| | | | |
|---|---|---|---|
| 6,047,034 A * | 4/2000 | Tsuruoka | 375/343 |
| 7,313,085 B2 | 12/2007 | Kim | |
| 7,746,941 B2 | 6/2010 | Chang et al. | |
| 2008/0144756 A1 | 6/2008 | Park et al. | |
| 2008/0152048 A1 * | 6/2008 | Adachi | 375/343 |
| 2009/0304128 A1 * | 12/2009 | Izumi et al. | 375/343 |
| 2011/0150144 A1 * | 6/2011 | Sohn | 375/340 |

FOREIGN PATENT DOCUMENTS

| | | |
|---|---|---|
| AE | 10-0809020 | 2/2008 |
| AF | WO 00/77961 A1 | 12/2000 |
| AI | 10-2006-0081496 | 7/2006 |
| JP | 2002-204214 | 7/2002 |
| KR | 2001-0002477 | 1/2001 |
| KR | 10-0555721 | 3/2006 |
| KR | 10-0602189 | 7/2006 |
| KR | 10-2007-0037004 | 4/2007 |
| KR | 10-0761791 | 9/2007 |
| WO | WO 2006/073278 A1 | 7/2006 |

* cited by examiner

*Primary Examiner* — Siu Lee
(74) *Attorney, Agent, or Firm* — Staas & Halsey LLP

(57) ABSTRACT

A timing synchronous detection device includes: a first autocorrelator that performs autocorrelation using a received signal and a first delay signal in which the received signal is delayed; a second autocorrelator that performs autocorrelation using the received signal and a second delay signal in which the received signal is delayed; an average-normalization device that obtains an average value of an output signal of the first autocorrelator and an output signal of the second autocorrelator; a comparator that compares the average value and a threshold value and that outputs, if the average value is larger than the threshold value, the average value; and a maximum value search device that searches for a maximum value of the average values that are output from the comparator.

20 Claims, 6 Drawing Sheets

DEVICE AND METHOD FOR DETECTING TIMING SYNCHRONIZATION

CROSS-REFERENCE TO RELATED APPLICATION

This application claims priority to and the benefit of Korean Patent Application No. 10-2009-0128406 filed in the Korean Intellectual Property Office on Dec. 21, 2010, the entire contents of which are incorporated herein by reference.

BACKGROUND OF THE INVENTION (a) Field of the Invention

The present invention relates to a device and method for detecting timing synchronization.

(b) Description of the Related Art

A communication system of an orthogonal frequency division multiplexing (OFDM) method is technology that divides all channels into narrowband subchannels having orthogonality and transmits the narrowband subchannels, and can effectively overcome selective fading of a frequency. Such an OFDM method sustains orthogonality of a symbol by inserting a cyclic prefix of a longer cycle than a delay spread of a channel into a front end of the symbol, thereby removing intersymbol interference (ISI), and thus the OFDM method is effective for high-rate data transmission.

However, a merit of the OFDM method is obtained only when orthogonality between subcarriers is sustained, and when orthogonality is not sustained, interchannel interference (ICI) occurs and thus system performance is deteriorated. Therefore, in a system of the OFDM method, it is important to synchronize time and frequency of a receiving apparatus.

A receiving apparatus such as a mobile station performs timing synchronization of an OFDM signal using a preamble signal that is transmitted by a base station. In general, the preamble includes an effective symbol having a constant fast fourier transform (FFT) size and a cyclic prefix that is inserted in front of the effective symbol. The cyclic prefix is equal to a signal of a last segment of an effective symbol.

A method of acquiring timing synchronization using such a preamble calculates a symbol timing metric that is defined based on a preamble structure, and regards a position of a specimen that maximizes a result thereof as a start position of the preamble. In this case, the preamble is obtained by loading a specific progression in an even-numbered subcarrier and performing an inverse fast fourier transform (IFFT), and thus an effective symbol has two specimen units that are repeated one time at a time axis.

Detection of a symbol timing metric can be performed by using only an interrelationship between repetition patterns existing in an effective symbol without considering an interrelationship between a cyclic prefix and an effective symbol. However, in such a method, a flat area is displayed in the symbol timing metric, and symbol timing estimate is not accurate.

Further, detection of a symbol timing metric may be performed in consideration of an interrelationship between a cyclic prefix and an effective symbol. However, in such a method, a flat area is not displayed in the symbol timing metric, but dispersion of the symbol timing estimate is large and thus performance of other algorithm blocks may be deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device and method for detecting timing synchronization having advantages of detecting accurate symbol timing synchronization in a communication system of an OFDM method.

An exemplary embodiment of the present invention provides a timing synchronous detection device including: a first autocorrelator that performs autocorrelation using a received signal and a first delay signal in which the received signal is delayed; a second autocorrelator that performs autocorrelation using the received signal and a second delay signal in which the received signal is delayed; an average-normalization device that obtains an average value of an output signal of the first autocorrelator and an output signal of the second autocorrelator; a comparator that compares the average value and a threshold value and that outputs, if the average value is larger than the threshold value, the average value; and a maximum value search device that searches for a maximum value of average values that are output from the comparator.

The received signal may be a preamble, and the first delay signal may be a signal that is delayed by a half of a size of the preamble.

The preamble may include a cyclic prefix, a first effective symbol segment, and a second effective symbol segment having the same size as that of the first effective symbol segment, and the cyclic prefix may perform autocorrelation with a last segment of the first effective symbol segment and may perform autocorrelation with a last segment of the second effective symbol segment.

The first autocorrelator may include: a delay device that generates the first delay signal; a first cumulative device that accumulates a multiplication result of the first delay signal and the received signal by the cyclic prefix length; a first calculator that calculates an absolute value of an output result from the first cumulative device; a square device that calculates a square value of an output result from the first calculator; a first energy calculator that calculates energy of the first delay signal; a second energy calculator that calculates energy of the received signal; a second cumulative device that accumulates a sum result of an output result of the first energy calculator and an output result of the second energy calculator; a second calculator that calculates a reciprocal of an output result from the second cumulative device; and a multiplication device that multiplies an output result of the square device and an output result of the second calculator and that outputs the output result as an output result of the first autocorrelator.

The timing synchronous detection device may further include a conjugate converter that generates a conjugate of the first delay signal, and that outputs the conjugate to multiply the received signal by the conjugate.

The received signal may be a preamble, and the second delay signal may be a signal that is delayed by a size of the preamble.

The preamble may include a cyclic prefix, a first effective symbol segment, and a second effective symbol segment having the same size as that of the first effective symbol segment, and the cyclic prefix may perform autocorrelation with a last segment of the first effective symbol segment and may perform autocorrelation with a last segment of the second effective symbol segment.

The second autocorrelator may include: a delay device that generates the second delay signal; a first cumulative device that accumulates a multiplication result of the second delay signal and the received signal by the cyclic prefix length; a first calculator that calculates an absolute value of an output result from the first cumulative device; a square device that calculates a square value of an output result from the first calculator; a first energy calculator that calculates energy of the second delay signal; a second energy calculator that calculates energy of the received signal; a second cumulative device that accumulates a sum result of an output result of the first energy calculator and an output result of the second energy calculator; a second calculator that calculates a reciprocal of an output result from the second cumulative device; and a multiplication device that multiplies an output result of the square device and an output result of the second calculator and that outputs the output result as an output result of the first autocorrelator.

The timing synchronous detection device may further include a conjugate converter that generates a conjugate of the second delay signal and that outputs the conjugate to multiply the received signal by the conjugate.

Another embodiment of the present invention provides a method in which a timing synchronous detection device detects timing synchronization using a received signal, the method including: performing first autocorrelation using the received signal and a first delay signal in which the received signal is delayed; performing second autocorrelation using the received signal and a second delay signal in which the received signal is delayed; obtaining an average value of a result of the first autocorrelator and a result of the second autocorrelator; comparing the average value and a threshold; and searching for, if the average value is larger than the threshold value, a maximum value of the average values.

The received signal may be a preamble, and the preamble may include a cyclic prefix, a first effective symbol segment, and a second effective symbol segment having the same size as that of the first effective symbol segment, and the cyclic prefix may perform autocorrelation with a last segment of the first effective symbol segment and may perform autocorrelation with a last segment of the second effective symbol segment.

The performing of first autocorrelation may include: generating the first delay signal by delaying the received signal by a half of a size of the preamble; multiplying the first delay signal and the received signal; accumulating the cyclic prefix length to a multiplied result of the first delay signal and the received signal and outputting the cumulative result as a first cumulative result; and calculating power of the first cumulative result. The performing of second autocorrelation may include: generating the second delay signal by delaying the received signal by a size of the preamble; multiplying the second delay signal and the received signal; accumulating the cyclic prefix length to a multiplied result of the second delay signal and the received signal and outputting the cumulative result as a second cumulative result; and calculating power of the second cumulative result.

The calculating of power may include calculating an absolute value of the second cumulative result, and obtaining a square value of the absolute value.

The performing of first autocorrelation may further include: calculating energy of the received signal and the first delay signal, adding the calculated energies, and outputting the added calculated energy as a first sum; and accumulating the first sum and outputting the accumulated first sum as a third cumulative result. The performing of second autocorrelation may include: calculating energy of the received signal and the second delay signal, adding the calculated energies, and outputting the added calculated energy as a second sum; and accumulating the second sum and outputting the accumulated second sum as a fourth cumulative result.

The performing of first autocorrelation may further include dividing the first cumulative result by the third cumulative result and outputting the divided first cumulative result as a result of the first autocorrelation, and the performing of first autocorrelation may further include dividing the second cumulative result by the fourth cumulative result and outputting the divided second cumulative result as a result of the second autocorrelation.

DETAILED DESCRIPTION OF THE EMBODIMENTS

Figure 1:
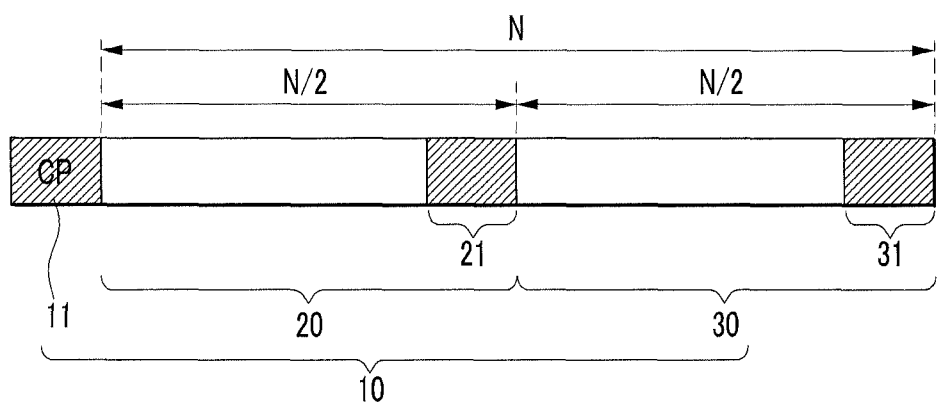
FIG. 1 is a diagram illustrating a preamble that is received in a timing synchronous detection device according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

Now, a timing synchronous detection device according to an exemplary embodiment of the present invention will be described in detail with reference to FIG. 1.

FIG. 1 is a diagram illustrating a preamble that is received in a timing synchronous detection device according to an exemplary embodiment of the present invention.

Referring to FIG. 1, a preamble 10 includes a cyclic prefix (CP) 11 and effective symbol segments 20 and 30. The effective symbol segments 20 and 30 together have an N size, and N is a size of a fast Fourier transform (FFT). The effective symbol segments 20 and 30 each have an N/2 size. The segments 20 and 30 include the same segments 21 and 31, respectively, as the cyclic prefix 11 at end portions thereof.

The preamble 10 may be a signal based on an orthogonal frequency division multiplexing (OFDM) method.

Now, a timing synchronous detection device according to an exemplary embodiment of the present invention will be described in detail with reference to FIG. 2.

Figure 2:
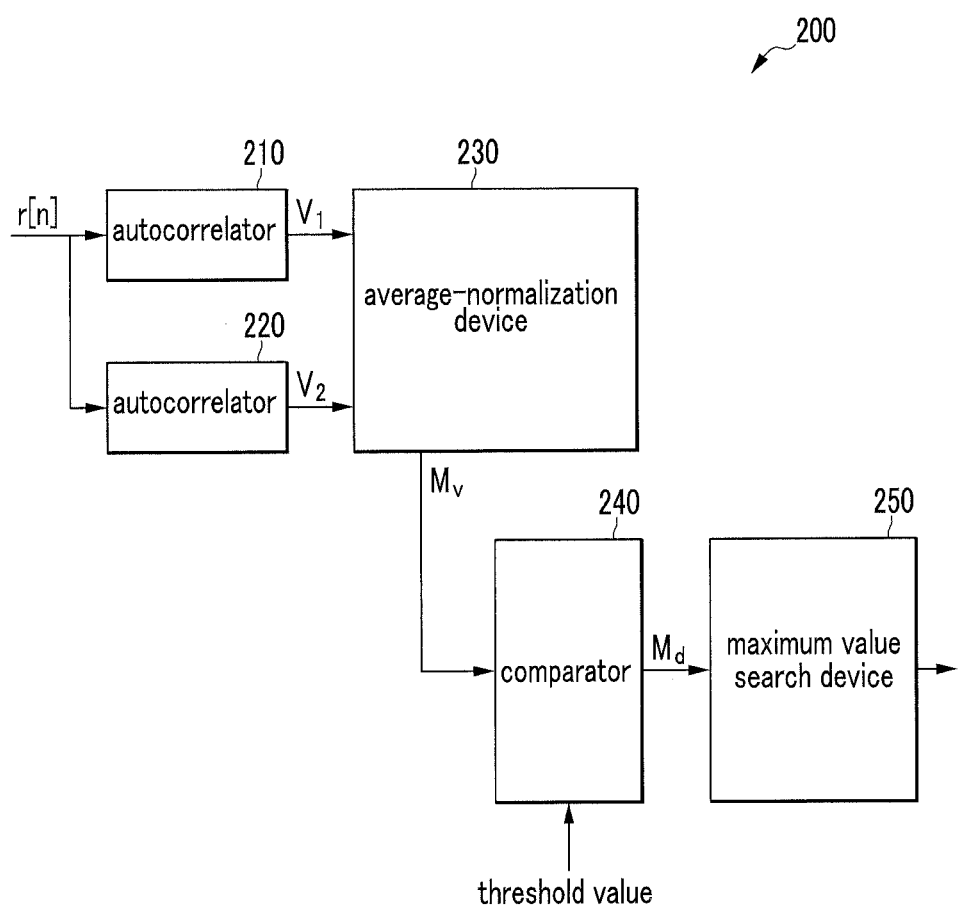
FIG. 2 is a block diagram illustrating a timing synchronous detection device according to an exemplary embodiment of the present invention.

FIG. 2 is a block diagram illustrating a timing synchronous detection device according to an exemplary embodiment of the present invention.

Referring to FIG. 2, a timing synchronous detection device 200 is included in a receiving apparatus such as a terminal, and detects timing synchronization of a symbol using a preamble that is transmitted to a downlink.

The timing synchronous detection device 200 includes autocorrelators 210 and 220, an average-normalization device 230, a comparator 240, and a maximum value search device 250.

The autocorrelator 210 performs autocorrelation using a received signal r[n] and a received signal in which an N/2 sample is delayed. Here, the received signal r[n] is a preamble 10 that is shown in FIG. 2, and N is a total size of effective symbol segments 20 and 30 of the preamble 10.

The autocorrelator 220 performs autocorrelation using the received signal r[n] and a received signal in which an N sample is delayed.

The average-normalization device 230 receives an output signal $V_1$ of the autocorrelator 210 and an output signal $V_2$ of the autocorrelator 220, and obtains an average value Mv of the output signals $V_1$ and $V_2$. The average value Mv is determined by Equation 1.

$$Mv = \text{mean}(V1+V2)/\text{max}(\text{mean}(V1+V2)) \qquad \text{[Equation 1]}$$

where "mean" indicates an average value, and "max" indicates a maximum value.

The comparator 240 receives a threshold value, receives an average value Mv from the average-normalization device 230, and compares the threshold value and the average value Mv, thereby determining effectiveness of the average value Mv. An output value Md of the comparator 240 is represented by Equation 2.

$$M_d = \begin{cases} M_v, & M_v \geq \text{Threshold} \\ 0, & \text{Otherwise} \end{cases} \qquad \text{[Equation 2]}$$

That is, if the average value Mv is larger than or equal to the threshold value, the output value Md of the comparator 240 is equal to the average value Mv, and otherwise the output value Md of the comparator 240 is 0.

The maximum value search device 250 receives an output value Md of the comparator 240 and searches for a maximum value.

In an ideal case having no effect on a channel or an interference signal, because a frame start position and initial symbol timing are acquired at a start position of a symbol, an FFT window position becomes a portion in which a protective interval, i.e., a cyclic prefix length, is added to an acquired position. However, a timing metric may be acquired later than an ideal case due to an effect of delay spread or an interference signal of a channel Therefore, initial symbol timing is determined as a position to which a protective interval length is added to a point at which the timing metric becomes the maximum and that is subtracted by a maximum value of delay spread of an expected channel.

Now, the autocorrelator 210 of the timing synchronous detection device according to an exemplary embodiment of the present invention will be described in detail with reference to FIG. 3.

Figure 3:
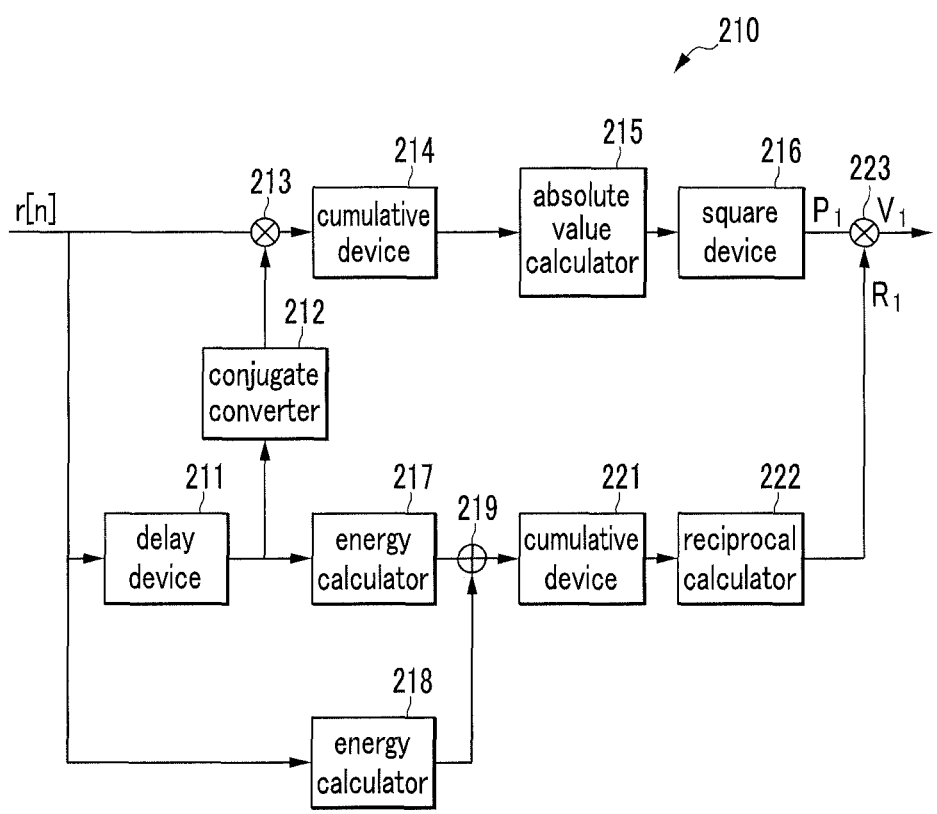
FIG. 3 is a block diagram of an autocorrelator according to an exemplary embodiment of the present invention.

FIG. 3 is a block diagram of an autocorrelator according to an exemplary embodiment of the present invention.

Referring to FIG. 3, the autocorrelator 210 includes a delay device 211, a conjugate converter 212, multipliers 213 and 223, cumulative devices 214 and 221, an absolute value calculator 215, a square device 216, energy calculators 217 and 218, an addition device 219, and a reciprocal calculator 222.

The delay device 211 delays a received signal r[n] by an N/2 sample.

The conjugate converter 212 acquires a conjugate of a signal that is delayed by an N/2 sample.

The multiplier 213 receives and multiplies the received signal r[n] and a conjugate of a signal in which an N/2 sample is delayed.

The cumulative device 214 receives a multiplication result from the multiplier 213 and accumulates the multiplication result by a cyclic prefix length.

The absolute value calculator 215 calculates an absolute value of an output signal from the cumulative device 214.

The square device 216 calculates and outputs a square value $P_1$ of an output signal from the absolute value calculator 215. The square value $P_1$ that is output by the square device 216 is represented by Equation 3.

$$P_1 = \left| \sum_{l=0}^{CP-1} r[n+l] \cdot r^*[n+l+N/2] \right|^2 \qquad \text{[Equation 3]}$$

where CP is a length of a cyclic prefix, and the calculated square value $P_1$ represents power.

The energy calculator 217 calculates energy of a signal in which an N/2 sample is delayed from the delay device 211, and the energy calculator 218 calculates energy of the received signal r[n].

The addition device 219 adds energies that are received from each of the energy calculators 217 and 218.

The cumulative device 221 receives and accumulates an addition result from the addition device 219.

The reciprocal calculator 222 calculates and outputs a reciprocal $R_1$ of an output signal from the cumulative device 221. The reciprocal $R_1$ that is output by the reciprocal calculator 222 is represented by Equation 4.

$$R_1 = \frac{1}{\sum_{l=0}^{CP-1} \{|r[n+l]|^2 + |r[n+l+N/2]|^2\}} \qquad \text{[Equation 4]}$$

The multiplier 223 multiplies the square value $P_1$ and the reciprocal $R_1$ and outputs the multiplied value as an output signal $V_1$ of the autocorrelator 210, and the output signal $V_1$ of the autocorrelator 210 is represented by Equation 5.

$$V_1 = P_1 \cdot R_1 \qquad \text{[Equation 5]}$$

In FIG. 3, the autocorrelator 210 is described, but the autocorrelator 220 is similar to the autocorrelator 210 of FIG. 3, and the autocorrelator 220 performs an autocorrelation process based on a signal that is delayed by an N sample.

Now, an average value My that is output by the average-normalization device 230 of a timing synchronous detection device according to an exemplary embodiment of the present invention will be described in detail with reference to FIGS. 4 and 5.

Figure 4:
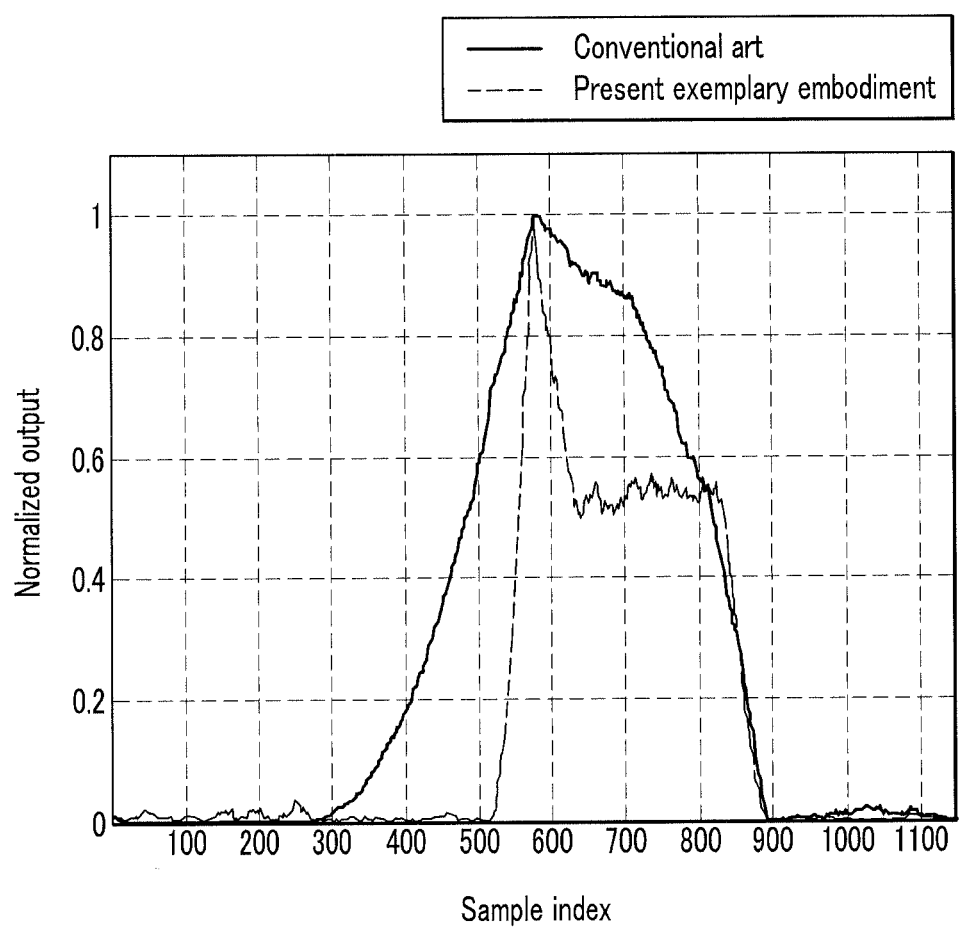
FIGS. 4 and 5 are graphs illustrating an average value My that is output by an average-normalization device according to an exemplary embodiment of the present invention and a conventional average-normalization device according to various sample indexes.
Figure 5:
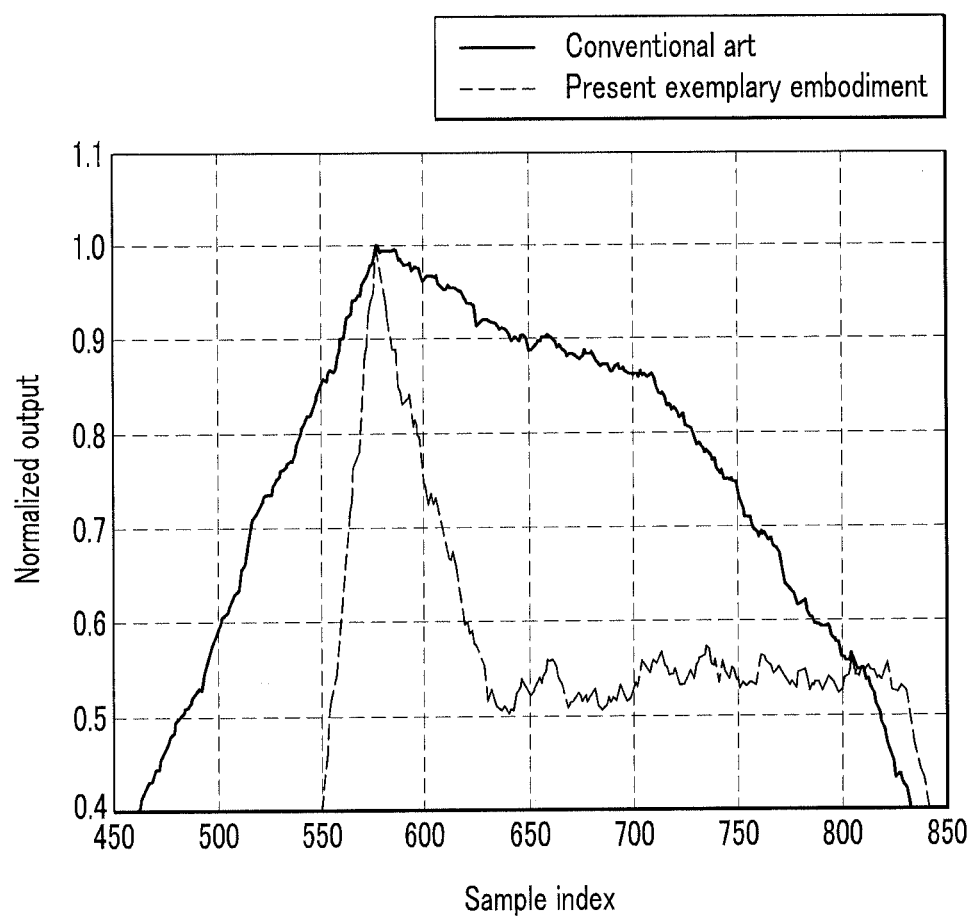

FIGS. 4 and 5 are graphs illustrating normalized outputs that are output by an average-normalization device according to an exemplary embodiment of the present invention and a conventional average-normalization device according to sample indexes.

In FIGS. 4 and 5, it is assumed that a size N of an FFT is 512, a length CP of a cyclic prefix is 64, i.e., N/8, a signal-to-noise ratio (SNR) is 0 dB, and channel noise is additive white gaussian noise (AWGN).

Referring to FIGS. 4 and 5, when a value of 0.8 or more is set as a threshold value of the comparator 240, in a normalized output that is output by the average-normalization device according to an exemplary embodiment of the present invention, dispersion of a symbol timing estimate is small, compared with a conventional art.

Now, a method of detecting timing synchronization according to an exemplary embodiment of the present invention will be described in detail with reference to FIG. 6.

Figure 6:
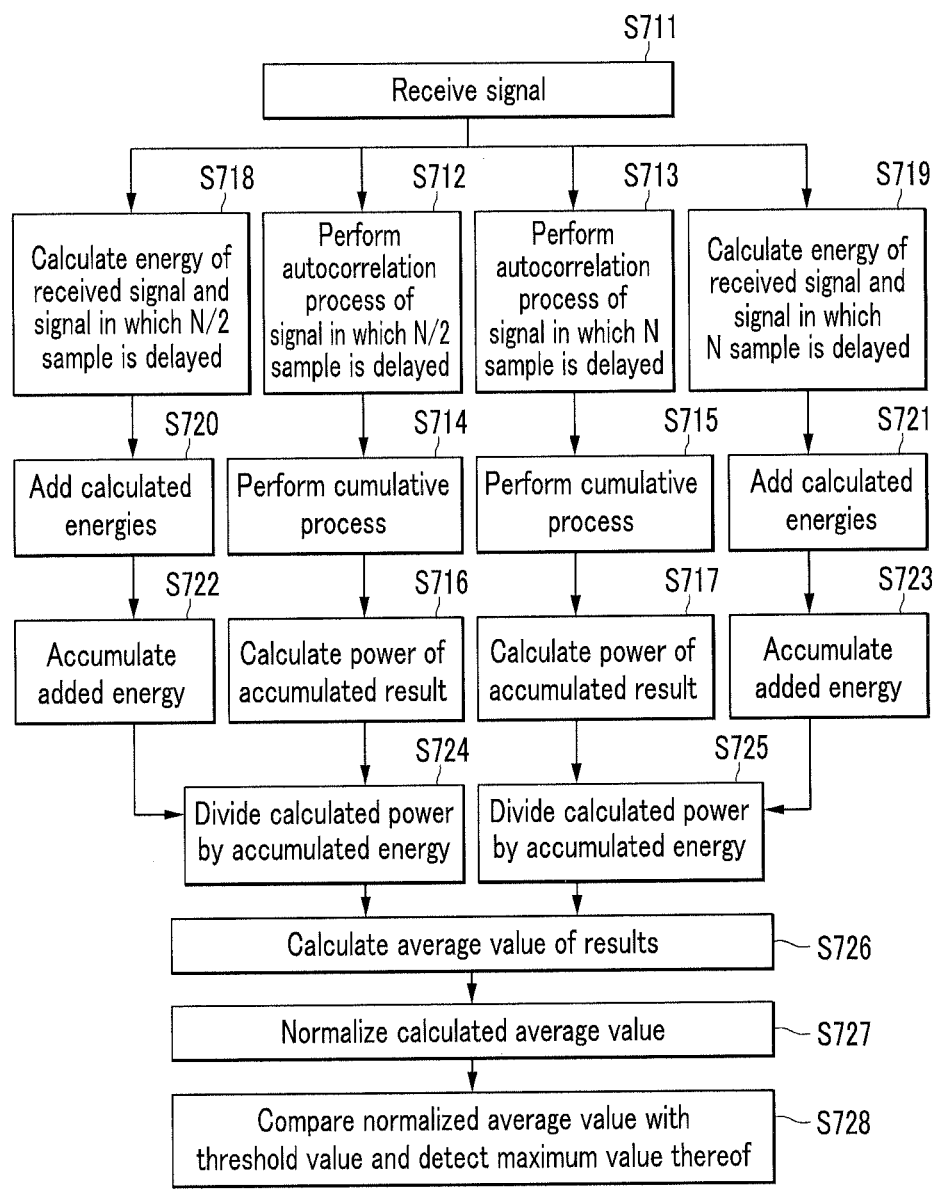
FIG. 6 is a flowchart illustrating a method in which a timing synchronous detection device detects timing synchronization according to an exemplary embodiment of the present invention.

FIG. 6 is a flowchart illustrating a method in which a timing synchronous detection device detects timing synchronization according to an exemplary embodiment of the present invention.

Referring to FIG. 6, the timing synchronous detection device 200 first receives a signal (S711). Here, a signal is a preamble signal according to an OFDM method.

Thereafter, the timing synchronous detection device 200 performs an autocorrelation process of a signal in which an N/2 sample is delayed (S712), and performs an autocorrelation process of a signal in which an N sample is delayed (S713). Thereafter, the timing synchronous detection device 200 performs a cumulative process corresponding to a cyclic prefix length of an autocorrelation result of a received signal and a signal in which an N/2 sample is delayed (S714), and performs a cumulative process corresponding to a cyclic prefix length of an autocorrelation result of a received signal and a signal in which an N sample is delayed (S715). The timing synchronous detection device 200 calculates power of an accumulated result at step S714 (S716), and calculates power of an accumulated result at step S715 (S717).

The timing synchronous detection device 200 calculates energy of a received signal and a signal in which an N/2 sample is delayed (S718), and calculates energy of a received signal and a signal in which an N sample is delayed (S719). Thereafter, the timing synchronous detection device 200 adds calculated energies of a received signal and a signal in which an N/2 sample is delayed (S720), and adds calculated energies of a received signal and a signal in which an N sample is delayed (S721). Thereafter, the timing synchronous detection device 200 accumulates the added energy at step S720 (S722), and accumulates the added energy at step S721 (S723).

Now, the timing synchronous detection device 200 divides power that is calculated at step S716 by energy that is accumulated at step S722 (S724), and divides power that is calculated at step S717 by energy that is accumulated at step S723 (S725).

Thereafter, the timing synchronous detection device 200 calculates an average value of results of step S724 and step S725 (S726) and normalizes the calculated average value (S727). Further, the timing synchronous detection device 200 compares the normalized average value with a threshold value and detects a maximum value thereof (S728). Here, when a maximum value exceeding the threshold value exists, timing synchronization is acquired.

Therefore, according to the present invention, a symbol timing metric that generates a maximum value at an accurate symbol timing position can be acquired, and in this case, dispersion of a symbol timing estimate can be sustained small.

According to the present invention, in a communication system of an OFDM method, by increasing accuracy of a symbol timing metric and decreasing dispersion, reliability of symbol timing synchronous detection can be improved. Thereby, an error occurring in signal demodulation of a receiving apparatus can be prevented.

An exemplary embodiment of the present invention may be not only embodied through the above-described apparatus and method, but also through a program that realizes a function corresponding to a configuration of exemplary embodiments of the present invention or a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A timing synchronous detection device comprising:
    a first autocorrelator that performs autocorrelation using a received signal and a first delay signal in which the received signal is delayed;
    a second autocorrelator that performs autocorrelation using the received signal and a second delay signal in which the received signal is delayed;
    an average-normalization device that obtains an average value of an output signal of the first autocorrelator and an output signal of the second autocorrelator;
    a comparator that compares the average value and a threshold value and that outputs, if the average value is larger than the threshold value, the average value; and
    a maximum value search device that searches for a maximum value of average values that are output from the comparator.

2. The timing synchronous detection device of claim 1, wherein the received signal is a preamble, and the first delay signal is a signal that is delayed by a half of a size of the preamble.

3. The timing synchronous detection device of claim 2, wherein the preamble comprises a cyclic prefix, a first effective symbol segment, and a second effective symbol segment having a same size as that of the first effective symbol segment, and the first autocorrelation is performed between the cyclic prefix with a last segment of the first effective symbol segment and the second autocorrelation is performed between the cyclic prefix with a last segment of the second effective symbol segment.

4. The timing synchronous detection device of claim 3, wherein the first autocorrelator comprises:
    a delay device that generates the first delay signal;
    a first cumulative device that accumulates a multiplication result of the first delay signal and the received signal by a cyclic prefix length;
    a first calculator that calculates an absolute value of an output result from the first cumulative device;
    a square device that calculates a square value of an output result from the first calculator;
    a first energy calculator that calculates energy of the first delay signal;

a second energy calculator that calculates energy of the received signal;

a second cumulative device that accumulates a sum result of an output result of the first energy calculator and an output result of the second energy calculator;

a second calculator that calculates a reciprocal of an output result from the second cumulative device; and a multiplication device that multiplies an output result of the square device and an output result of the second calculator and that outputs an output result as an output result of the first autocorrelator.

5. The timing synchronous detection device of claim 4, further comprising a conjugate converter that generates a conjugate of the first delay signal and that outputs the conjugate to multiply the received signal by the conjugate.

6. The timing synchronous detection device of claim 1, wherein the received signal is a preamble, and the second delay signal is a signal that is delayed by a size of the preamble.

7. The timing synchronous detection device of claim 6, wherein the preamble comprises a cyclic prefix, a first effective symbol segment, and a second effective symbol segment having a same size as that of the first effective symbol segment, and the first autocorrelation is performed between the cyclic prefix with a last segment of the first effective symbol segment and the second autocorrelation is performed between the cyclic prefix with a last segment of the second effective symbol segment.

8. The timing synchronous detection device of claim 7, wherein the second autocorrelator comprises:

a delay device that generates the second delay signal;

a first cumulative device that accumulates a multiplication result of the second delay signal and the received signal by a cyclic prefix length;

a first calculator that calculates an absolute value of an output result from the first cumulative device;

a square device that calculates a square value of an output result from the first calculator;

a first energy calculator that calculates energy of the second delay signal;

a second energy calculator that calculates energy of the received signal;

a second cumulative device that accumulates a sum result of an output result of the first energy calculator and an output result of the second energy calculator;

a second calculator that calculates a reciprocal of an output result from the second cumulative device; and a multiplication device that multiplies an output result of the square device and an output result of the second calculator and that outputs an output result as an output result of the first autocorrelator.

9. The timing synchronous detection device of claim 8, further comprising a conjugate converter that generates a conjugate of the second delay signal and that outputs the conjugate to multiply the received signal by the conjugate.

10. A method in which a timing synchronous detection device detects timing synchronization using a received signal, the method comprising:

performing first autocorrelation using the received signal and a first delay signal in which the received signal is delayed;

performing second autocorrelation using the received signal and a second delay signal in which the received signal is delayed;

obtaining an average value of a result of the first autocorrelation and a result of the second autocorrelation;

comparing the average value and a threshold value; and searching for, if the average value is larger than the threshold value, a maximum value of the average values.

11. The method of claim 10, wherein the received signal is a preamble, and the first delay signal is a signal that is delayed by a half of a size of the preamble.

12. The method of claim 11, wherein the preamble comprises a cyclic prefix, a first effective symbol segment, and a second effective symbol segment having a same size as that of the first effective symbol segment, and the first autocorrelation is performed between the cyclic prefix with a last segment of the first effective symbol segment and the second autocorrelation is performed between the cyclic prefix with a last segment of the second effective symbol segment.

13. The method of claim 12, wherein the performing of first autocorrelation comprises:

generating the first delay signal by delaying the received signal by a half of the size of the preamble;

multiplying the first delay signal and the received signal;

accumulating a cyclic prefix length to a multiplied result of the first delay signal and the received signal and outputting the cumulative result as a first cumulative result; and calculating power of the first cumulative result.

14. The method of claim 13, wherein the calculating of power comprises:

calculating an absolute value of the first cumulative result; and obtaining a square value of the absolute value.

15. The method of claim 14, wherein the performing of first autocorrelation further comprises:

calculating energy of the received signal and the first delay signal, adding the calculated energies, and outputting the added calculated energy as a first sum; and accumulating the first sum and outputting the accumulated first sum as a third cumulative result.

16. The method of claim 15, wherein the performing of first autocorrelation further comprises dividing the power of the first cumulative result by the third cumulative result and outputting the divided power of the first cumulative result as a result of the first autocorrelation.

17. The method of claim 11, wherein the second delay signal is a signal that is delayed by the size of the preamble, and the preamble comprises a cyclic prefix, a first effective symbol segment, and a second effective symbol segment having a same size as that of the first effective symbol segment, and the first autocorrelation is performed between the cyclic prefix with a last segment of the first effective symbol segment and the second autocorrelation is performed between the cyclic prefix with a last segment of the second effective symbol segment.

18. The method of claim 17, wherein the performing of second autocorrelation comprises:

generating the second delay signal by delaying the received signal by the size of the preamble;

multiplying the second delay signal and the received signal;

accumulating a cyclic prefix length to a multiplied result of the second delay signal and the received signal and outputting the cumulative result as a second cumulative result; and calculating power of the second cumulative result.

19. The method of claim 18, wherein the calculating of power comprises:

calculating an absolute value of the second cumulative result; and obtaining a square value of the absolute value.

20. The method of claim 18, wherein the performing of second autocorrelation further comprises:
- calculating energy of the received signal and the second delay signal, adding the calculated energies, and outputting the added calculated energy as a second sum; and
- accumulating the second sum and outputting the accumulated second sum as a fourth cumulative result.

* * * * *